Aug. 5, 1930.                R. H. DANEEL                1,772,212
               MEANS FOR INFLATING PNEUMATIC TIRES
                      Filed Aug. 26, 1927
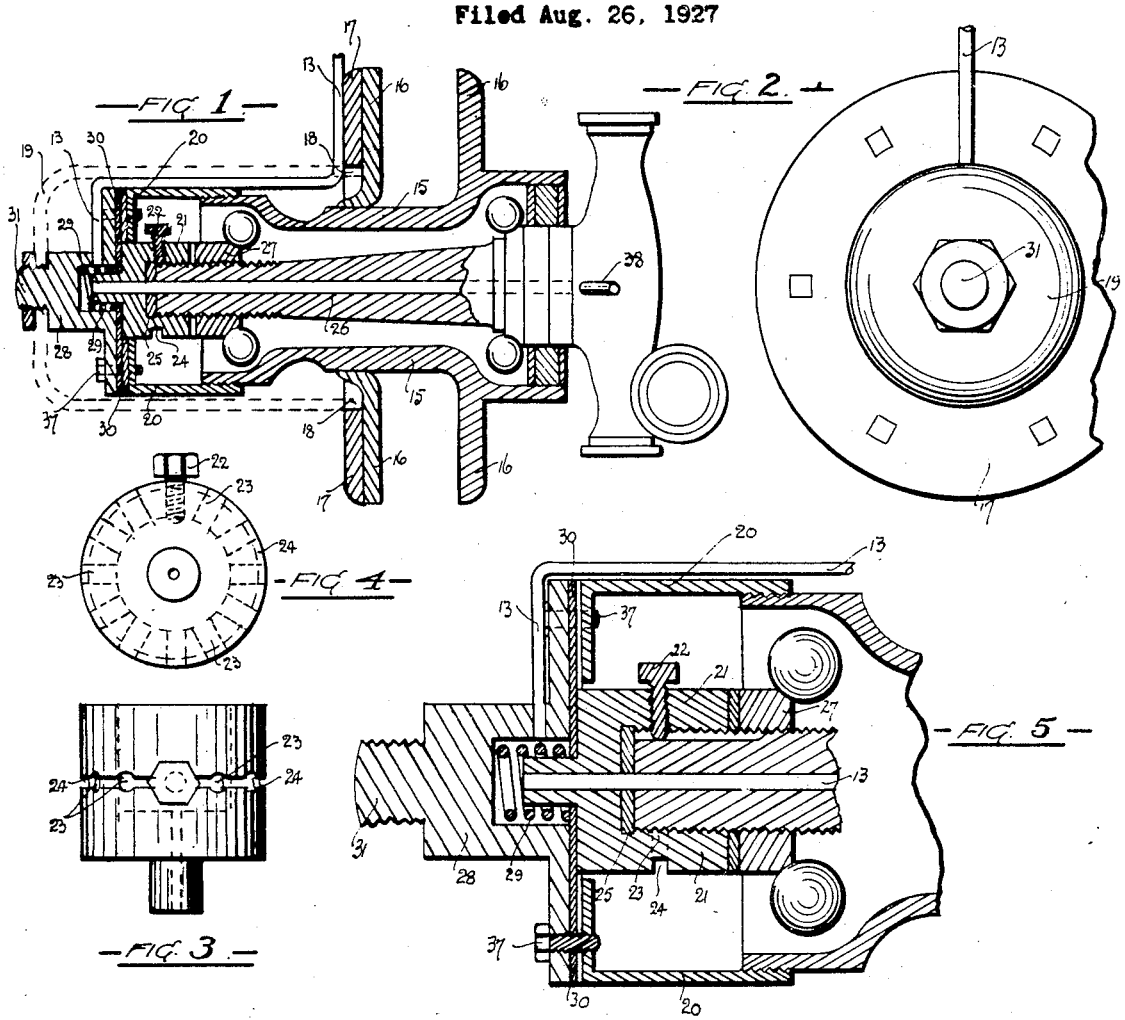
INVENTOR:
R. H. Daneel
BY Marks & Clerk
ATTORNEYS.

Patented Aug. 5, 1930

1,772,212

UNITED STATES PATENT OFFICE

RICHARD HURTLEY DANEEL, OF BRITSTOWN, UNION OF SOUTH AFRICA

MEANS FOR INFLATING PNEUMATIC TIRES

Application filed August 26, 1927. Serial No. 215,746.

This invention relates to means for inflating pneumatic tires and has particular reference to a means for effecting this purpose, whilst the vehicle is in motion or at rest.

In accordance with my invention I provide a continuous or uninterrupted air line between the inflating means located on the chassis and the inner tube of the tire.

It will be readily understood by those skilled in the art to which this invention appertains that it is a simple matter to provide an efficient air line from any one point to any other on the chassis of a vehicle and likewise to provide an air line from any one point on the wheel to the inner tube of the tire of that wheel, and that the difficulty to be overcome in the practice of the method set forth in the last preceding paragraph is the establishment and maintenance of continuity along such an air line when provision has to be made for the revolution of the wheel. This difficulty I have overcome by substituting for the standard hub cap one of modified form in which is located an air seal whose efficiency depends upon the pressure provided by the air in the air line and the action of a compression spring.

In order that my invention may be readily understood and carried into practice I will now describe by way of example a convenient embodiment thereof as applied to an automobile and wherein:—

Fig. 1 is a longitudinal section through a front wheel leaving shewing the position of airline and sealing device with outer hub cap removed.

Fig. 2 is an end elevation of the same with outer hub housing in position.

Fig. 3 is a plan of the front spindle terminal locking nut.

Fig. 4 is a front elevation of the same.

Fig. 5 is an enlarged sectional detail of the air sealing cap and the spindle terminal locking nut.

Referring to these drawings wherein like numbers of reference indicate the same or corresponding parts wherever occurring throughout all the figures.

15 indicates the front wheel hub and 16 the usual wheel flanges the outer of which has bolted to it a reinforcing flange 17 bored out to form a recess 18 for the cylindrical housing 19 within which is fitted a modified form of hub cap 20 whose centre is bored to take the projecting end of a terminal locking nut 21 which is provided with a set screw 22 and tapped aperture 23 around its circumference to facilitate fine adjustment. Along the line of the aperture 23 is a channel 24 for the reception of a sealing wire if found necessary. This locking nut 21 is further provided with an airtight washer 25 inside where it makes connection with the end of the axle 26 on which it screws forming as well a lock nut to the bearing cone 27. The other end of the locking nut 21 terminates in a projection which enters a recess in the sealing cap 28 and is surrounded by a compression spring 29 which exerts pressure against a sealing washer 30 bearing against the face of the locking nut 21. Emerging from the abovementioned recess in the sealing cap 28 is the air line 13. The sealing cap 28 terminates in a screwed projection 31 to which is attached the cylindrical housing 19.

The axle 26 is pierced to form a continuation of the air line 13 and this is connected to the main air supply by means of a nipple 38 inserted obliquely in the axle opposite the inner cone flange.

The stopcocks, unions and pressure gauges are of the accepted types and require no further description.

The air having been conducted by suitable means such as thin spring copper tubing or the like which lends itself to inconspicuous location, to the desired points on the chassis when a supply of compressed air is available it now remains to make connection with the front wheels since it is desired to inflate while the car or vehicle is in motion.

In the case of the front wheels I achieve this by drilling the spindles from their outer extremities centrally up to a point in each opposite the inner cone flange where another hole drilled obliquely from the outside of the spindle and just behind the cone flange above mentioned meets it.

This oblique hole is tapped to receive a short length of brass or steel tubing. A strong flexible tube connects this projecting tube to the end of the air line coming from the central unit and ending just over the front axle. The air now discharges from the end of the spindle into an air seal constructed to prevent any leakage between the stationary axle and parts of the wheel whether it is rotating or at rest. In order to fit the air seal the standard hub cab is removed and one of modified form used. The face of this hub cap is bored to receive a pierced locking terminal nut which is screwed on to the end of the axle and makes an air-tight connection therewith by means of a washer of leather or the like. This locking nut is drilled radially at intervals around its circumference to accommodate a set screw and is further provided with a shallow channel crossing these apertures for the purpose of locking the setscrew if this is deemed necessary. By piercing this locking nut the air line is continued from the axle through a projection into a corresponding recess formed in a sealing cap which is bolted on to the face of the modified hub cap. From this recess the air line is continued by means of suitable tubing radially outwards and over the hub cap and then inwards to one of the spokes along which it is conducted to the valve opening in the tire.

The junction between the surfaces of the sealing cap, modified hub cap and terminal locking nut (face of which must be flush with the face of the hub cap when the latter is screwed home) is the point at which air may be expected to leak and to avoid this a washer of resilient and self-lubricating material is fitted to lie between these surfaces and a compression spring in the recess of the sealing cap maintains contact between the aforementioned surfaces pending the admission of air from the compressor. While pressure is being maintained by the compressor the washer automatically effects the sealing irrespective of the spring.

Furthermore as well as preventing the escape of air the function of this washer is to prevent the ingress of oil or rather lubricant from the bearings to the air line.

By reason of the fitting of a modified hub cap the usual means of lubricating is done away with but lubricant can be readily injected into the bearings by means of an oil hole which may be drilled at any convenient point in the hub between the hub cap and the wheel flange.

The air seal caps of the wheels have dome ended cylindrical housings fitted over them which reach right up to the hub flange.

The fitting of an oil trap at a suitable point in the air line completes the inflating system from which it will be seen that I have by my invention provided an effective simple and reliable means whereby the front tires of a vehicle can be inflated whether at rest or in motion, and whereby a punctured tire or tires may be rendered capable of supporting the vehicle by the continuous supply of air thereto.

What I claim is:—

1. Means for conveying air pressure from a source of supply on the body of a motor vehicle to the tires of the front wheels thereof, comprising in combination non-rotary axles formed with an axial bore and an end washer seat, an end cap carried on the wheel hub and having a recess located opposite the axial bore at the outer end of the axle, a pipe communicating with the said recess and thence to the tire, and a flexible washer peripherally connected to the cap and having a free central inner surface adapted to bear against the end washer seat of the axle making an air-tight seal between the cap and the axle when air pressure is conveyed through the axle bore.

2. Means for conveying air pressure from a source of supply on the body of a motor vehicle to the tires of the front wheels thereof, comprising in combination non-rotary axles formed with an axial bore and an end washer seat, an end cap carried on the wheel hub and having a recess located opposite the axial bore at the outer end of the axle, a pipe communicating with the said recess and thence to the tire, a flexible washer peripherally connected to the cap and having a free central inner surface adapted to bear against the end seat of the axle making an air-tight seal between the cap and the axle when air pressure is conveyed through the axle bore, and a spring located in the cap adapted to press the central portion of the washer against the seat on the axle end whereby an initial sealing is secured ready for the positive sealing by means of the air pressure.

3. In means for conveying air pressure from a source of supply on the body of a motor vehicle to the tires of the front wheels thereof, comprising in combination non-rotary axles formed with an axial bore, a nut adapted to seat on the end of the axle and having an axial bore in alignment with that of the axle and an end washer bearing surface, an end cap carried by the wheel hub having a recess located opposite the axial bore of said nut, a pipe communicating with said recess and thence to the tire, a flexible washer peripherally connected to the cap and having a free central inner surface adapted to bear against the end bearing surface of the nut making an air tight seal between the cap and the nut when air pressure is conveyed through the axle and nut bores.

In testimony whereof I have affixed my signature.

RICHARD HURTLEY DANEEL.